Patented Apr. 1, 1941

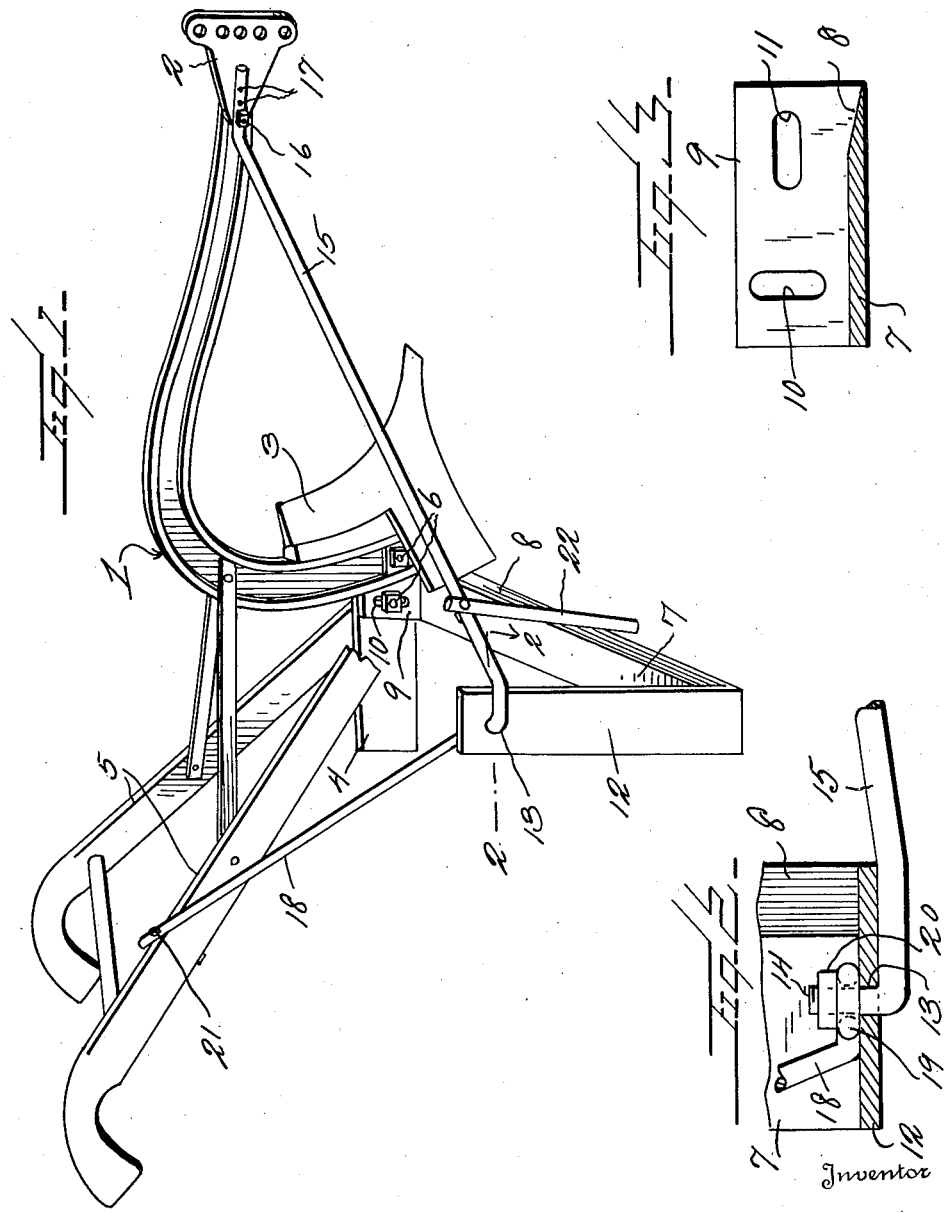

2,236,931

UNITED STATES PATENT OFFICE 2,236,931

PEANUT CUTTER ATTACHMENT FOR PLOWS

John C. Whitton, Ponce de Leon, Fla.

Application September 30, 1939, Serial No. 297,372

5 Claims. (Cl. 55—60)

This invention relates to the class of plows and pertains particularly to a plow attachment for use in the harvesting of peanuts.

The present invention has for its primary object to provide an attachment for a standard type of single beam plow by means of which such plow may be employed for harvesting peanuts by cutting through the earth a few inches below the surface so as to sever the roots of the peanut plant thus leaving the plant free, with the peanuts attached, for harvesting.

Another object of the invention is to provide an attachment for a plow consisting of a relatively long blade designed to be connected at one end to the body of the plow by means of certain bolts which form a regular part of the plow structure, the blade extending laterally from the plow and being held by such bolts with its under face in the plane of the lower or cutting edge of the plow point so that when the plow is forced into the ground to the proper depth such blade will also be made to cut into the earth and will be drawn through the earth below the surface.

Still another object of the invention is to provide a structure of the character above set forth wherein a single means is employed for coupling the outer end of the blade with the beam of the plow and with one handle thereof whereby such blade will be effectively braced.

Still another object of the invention is to provide in a structure of the character above stated, a means for shifting the tops of the plants with respect to the cutting blade whereby the blade may pass smoothly beneath the plants and the plants will be left standing or substantially upright after the roots have been cut so that the plants may be conveniently harvested together with the nuts attached to the same.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in perspective of a plow showing the device embodying the present invention attached thereto;

Figure 2 is a sectional view taken substantially on the line 2—2 of Figure 1;

Figure 3 is a sectional view taken transversely of the attachment blade and looking toward the plow end thereof.

Referring now more particularly to the drawing, the numeral 1 generally designates the draft beam of a plow of ordinary or common design, which beam carries at its forward end the usual clevis 2 by means of which the draft animal or machine may be attached to the plow.

At the rear of the beam the numeral 3 designates the usual plow point from one side of which there extends rearwardly the landside 4. The handles for the plow are indicated by the numeral 5, these being attached in the usual well known manner and in this connection also it may be stated that while the detailed construction of the lower part of the plow has not been illustrated to show the manner in which the point 3 and landside 4 are connected with the beam, it will be understood that these parts are connected through the usual frog unit, not shown. As is, of course, well known, the parts referred to are secured to the frog by bolts 6 and these bolts are made use of in connecting the present attachment to the plow.

In the employment of the device embodying the present invention, the usual mold board of the plow is removed. The attachment comprises a relatively long flat blade 7 having one edge sharpened, as indicated at 8. This blade may be anywhere from sixteen to thirty inches in length according to the widths of the rows of plants to be harvested and at one end the blade has an upstanding ear or flange 9 which, as shown in Figure 3, is provided with a vertically extending slot 10 and a horizontally extending slot 11. These slots receive the frog bolts 6 to secure the blade to the plow so that it will extend outwardly substantially at right angles to the line of draft. By arranging one of the slots vertically and the other one horizontally the proper adjustment of the blade can be made to bring the cutting edge 8 substantially into the plane of the lower edge of the point 3.

At the outer end of the blade there is formed the upstanding arm or post 12 which may be of any suitable height but which is preferably around seventeen inches long. At the upper end of this arm or post an aperture 13 is formed into which is engaged the threaded laterally turned end 14 of a brace rod 15. This brace rod is angled at the end adjacent the portion 14 so that it may extend forwardly and laterally with respect to the plow beam 1 so that its forward end may be brought into position against the side of the clevis 2 where it is secured by means of a bolt 16. As shown, the forward end of this brace rod is suitably angled to position it flat against the side of the clevis and is provided with a number of bolt apertures 17 so that necessary adjustments may be made or so that the rod may be attached to plows having draft beams of different lengths.

The rod 15 constitutes a front brace and associated with it is a rear brace rod which is indicated generally by the numeral 18. This rear brace rod terminates at its forward end in an eye 19 which positions against the inner side of the post 12 and has the angled end 14 of the front rod extended therethrough as shown in Figure 2. A nut 20 threaded on the angled end 14 of the front rod secures these members together and to the post 12. The rear end of the rear brace rod 18 is coupled to the handle 5 nearest the blade 7, by a bolt 21 as shown, or in any other suitable manner. Thus, the brace rods 15-18 extend extend in divergent relation from the post 12, one extending forwardly and the other rearwardly and thereby hold the outer end of the blade rigidly in position.

In order that the peanut plants may not be pulled from the ground by the post 12 there is provided the deflector 22 which is in the form of a rod of suitable weight which is attached at one end to the brace rod 15 a few inches in front of the post 12 so as to hang down as shown. Because of the angular disposition of the brace rod 15 with respect to the line of draft of the plow this deflector 22 will be disposed slightly inwardly of the post 12. Thus, it will be seen that the peanut plants will come into contact with the deflector before the cutting blade strikes the plant roots and the deflector will force the top part of the plant over out of the way of the post 12.

It is thought that the action of the plow attachment as described will be readily obvious. When the plow point is forced into the ground to the proper depth it will cause the cutting blade to enter the ground also and when the right depth has been reached and the point of the blade straightened out, then the cutting blade will move along beneath the surface of the ground at the right depth to cut off the roots of the peanut plants leaving the peanuts attached to the bottom of the plant and leaving the plants standing but in condition to be easily removed from the ground with the attached nuts.

I claim:

1. An attachment for a plow having a draft beam, handles, and frog bolts, comprising an elongated blade body having one longitudinal edge sharpened, an upstanding flange formed integral with one end of the blade and apertured to receive said bolts whereby the blade will be secured to extend laterally from the plow beam, an upstanding arm at the outer end of said blade, brace rods connecting said arm with said beam and one of said handles, and a plant deflector member carried by one of said brace rods and extending downwardly therefrom and disposed forwardly of the blade.

2. The combination with a plow having a beam, a point, a landside, handles and a frog secured to the beam and landside by bolts, of a relatively long blade having a sharpened longitudinal edge, an upstanding ear at one end of said blade having a pair of slots formed therethrough, said slots being arranged to have said bolts extended therethrough, an upstanding post at the other end of said blade, a brace rod having a laterally turned threaded end extending through an aperture in said post and extending forwardly and having its other end attached to said beam, and a second brace rod having an eye formed at one end to receive said laterally turned end of the first rod and extending rearwardly and inwardly toward one of said handles and having its other end attached thereto, and a nut on the said threaded end of the first rod and securing the rods to said bolts.

3. The combination with a plow having a beam, a point, a landside, handles and a frog secured to the beam and landside by bolts, of a relatively long blade having a sharpened longitudinal edge, an upstanding ear at one end of said blade having a pair of slots formed therethrough, said slots being arranged to have said bolts extended therethrough, an upstanding post at the other end of said blade, a brace rod having a laterally turned threaded end extending through an aperture in said post and extending forwardly and having its other end attached to said beam, and a second brace rod having an eye formed at one end to receive said laterally turned end of the first rod and extending rearwardly and inwardly toward one of said handles and having its other end attached thereto, a nut on the said threaded end of the first rod and securing the rods to said bolts, and a plant deflector comprising a rod member attached at one end to the first brace rod adjacent to said arm and extending downwardly from the attached rod.

4. An attachment for a plow having the usual frog bolts, comprising an elongated blade body, means at one end of the body for attaching the same to the plow by said bolts, a longitudinal edge of the body being sharpened and directed forwardly with respect to the plow, an upstanding arm disposed at the other end of the blade, bracing means connecting the arm with the body of the plow, and a plant deflector member supported in a position forwardly of and above said blade and adjacent the said other end thereof.

5. An attachment for a plow having the usual frog bolts, comprising an elongated blade body, means at one end of the body for attaching the same to the plow by said bolts, a longitudinal edge of the body being sharpened and directed forwardly with respect to the plow, an upstanding arm disposed at the other end of the blade, bracing means connecting the arm with the body of the plow, and a plant deflecting arm connected at one end with the bracing means adjacent to said blade arm, and extending downwardly toward and spaced at its lower end from the said edge of the body, the plant deflecting arm being arranged forwardly of said edge.

JOHN C. WHITTON.